(12) United States Patent
Wörz et al.

(10) Patent No.: US 10,065,297 B2
(45) Date of Patent: Sep. 4, 2018

(54) METHOD AND DEVICE FOR OPERATING A HAND-HELD MACHINE TOOL WITH A TANGENTIAL IMPACT MECHANISM

(71) Applicant: Hilti Aktiengesellschaft, Schaan (LI)

(72) Inventors: Joachim Wörz, Penzing (DE); Michael Brandner, Landsberg am Lech/Erpfting (DE)

(73) Assignee: Hilti Aktiengesellschaft, Schaan (LI)

( * ) Notice: Subject to any disclaimer, the term of this patent is extended or adjusted under 35 U.S.C. 154(b) by 628 days.

(21) Appl. No.: 14/433,724

(22) PCT Filed: Oct. 7, 2013

(86) PCT No.: PCT/EP2013/070778
§ 371 (c)(1),
(2) Date: Apr. 6, 2015

(87) PCT Pub. No.: WO2014/056820
PCT Pub. Date: Apr. 17, 2014

(65) Prior Publication Data
US 2015/0246435 A1 Sep. 3, 2015

(30) Foreign Application Priority Data

Oct. 8, 2012 (DE) .......... 10 2012 218 300

(51) Int. Cl.
 *B25B 21/02* (2006.01)
 *B25B 23/147* (2006.01)

(52) U.S. Cl.
CPC .......... *B25B 23/1475* (2013.01); *B25B 21/02* (2013.01); *B23B 2270/48* (2013.01)

(58) Field of Classification Search
CPC .. B25B 23/1475; B25B 21/02; B23B 2270/48
USPC ............................................. 173/1, 176, 178
See application file for complete search history.

(56) References Cited

U.S. PATENT DOCUMENTS

| | | | |
|---|---|---|---|
| 5,038,084 A | 8/1991 | Wing | |
| 5,440,215 A * | 8/1995 | Gilmore | B23P 19/066 173/178 |
| 5,754,019 A | 5/1998 | Walz | |
| 6,536,536 B1 * | 3/2003 | Gass | B23B 31/123 173/171 |
| 7,334,648 B2 * | 2/2008 | Arimura | B25B 21/02 173/176 |

(Continued)

FOREIGN PATENT DOCUMENTS

| | | |
|---|---|---|
| EP | 1 457 285 A1 | 9/2004 |
| GB | 2 400 811 A | 10/2004 |

OTHER PUBLICATIONS

International Search Report, dated Nov. 26, 2013, PCT/EP2013/070778.

*Primary Examiner* — Michelle Lopez
(74) *Attorney, Agent, or Firm* — Leydig Voit & Mayer

(57) ABSTRACT

The invention relates to a method for operating a hand-held machine tool with a tangential impact mechanism which can be driven by means of a drive shaft and an electric motor, according to which method an actual torque provided by the drive shaft is adjusted to a required torque depending on a measured motor current, wherein the required torque is less than a triggering torque of the tangential impact mechanism.

10 Claims, 2 Drawing Sheets

(56) References Cited

U.S. PATENT DOCUMENTS

Figure 1:
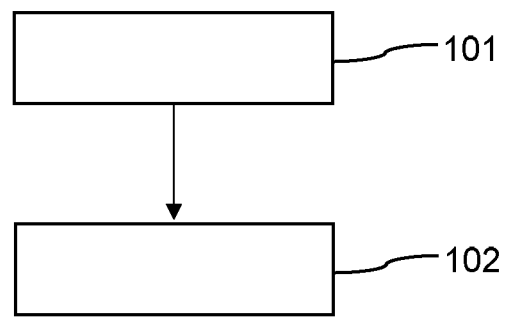

| | | | | |
|---|---|---|---|---|
| 2002/0060082 A1* | 5/2002 | Watanabe | ............... | B25B 21/02 |
| | | | | 173/176 |
| 2014/0374130 A1* | 12/2014 | Nakamura | ............ | B25B 21/026 |
| | | | | 173/176 |
| 2015/0122521 A1* | 5/2015 | Chen | ........................ | B25F 5/001 |
| | | | | 173/1 |
| 2015/0231771 A1* | 8/2015 | Sakai | .................... | B25B 21/026 |
| | | | | 173/176 |

* cited by examiner

METHOD AND DEVICE FOR OPERATING A HAND-HELD MACHINE TOOL WITH A TANGENTIAL IMPACT MECHANISM

CROSS-REFERENCE TO RELATED APPLICATIONS

This patent application is the U.S. National Stage of International Application No. PCT/EP2013/070778, filed Oct. 7, 2013, which claims the benefit of German Application No. 102012218300.0, filed Oct. 8, 2012, which are each incorporated by reference.

BACKGROUND OF THE INVENTION

The invention under consideration concerns a method and a device for operating a hand-held machine tool with a tangential impact mechanism that can be driven by means of a drive shaft and an electric motor. The invention also concerns a control device for a hand-held machine tool with such a device and such a hand-held machine tool, in particular, an electrical hand-held machine tool, such as an electric screwdriver or a hand-held drilling machine.

With a traditional hand-held machine tool with a tangential impact mechanism, such as a tangential impact screwdriver, the rotational speed of the electric motor is reduced after the time that the tangential impact mechanism starts operation. As a rule, however, this is not desired if the tangential impact screwdriver is used for drilling, since, during drilling, a high rotational speed is advantageous. If the rotational speed is reduced, the time needed for the drilling is prolonged. A traditional tangential impact screwdriver can, moreover, for example, not be used for the cutting of screw threads, since the corresponding cutting tool can be damaged by using the tangential impact mechanism.

Accordingly, one goal of the invention under consideration is to create an improved method for operating a hand-held machine tool with a tangential impact mechanism that can be driven by means of a drive shaft and an electric motor.

BRIEF SUMMARY OF THE INVENTION

Accordingly, a method for operating a hand-held machine tool with a tangential impact mechanism that can be driven by means of a drive shaft and electric motor is proposed. The method includes an adjustment of an actual torque provided by the drive shaft, as a function of a measured motor current of the electric motor, to a required torque, wherein the required torque is less than a triggering torque of the tangential impact mechanism.

The concept of the adjustment thereby comprises the control and regulation of the actual torque to the required torque.

By this adjustment of the actual torque to the required torque, it is possible to use the hand-held machine tool in spite of the available tangential impact mechanism for the application drilling, without the rotational speed of the motor being disadvantageously reduced. Thus, it is also possible to use the hand-held machine tool for the application of cutting threads.

In one embodiment, the actual torque is regulated to the required torque. This corresponds to the regulation of the actual torque, comprised by the adjustment, to the required torque. In one adjustment, the required torque is determined as a function of the measured motor current, wherein the actual torque is regulated to the determined required torque.

In one embodiment, the tangential impact mechanism is switched on if a value of the measured motor current exceeds a stipulated motor current threshold value.

Thus, the tangential impact mechanism can be switched on as a function of the stipulated motor current threshold value, in spite of the adjustment of the actual torque to the required torque. The hand-held machine tool can thus be also advantageously used for the application impact drilling.

In another embodiment, the stipulated motor current threshold value is at least 15 amperes.

The proposed 15 amperes are a sufficiently high motor current threshold value, which prevents an excessively early switching on of the tangential impact mechanism and, at the same time, makes possible a prompt switching on of the tangential impact mechanism.

In another embodiment, the adjustment of the actual torque to the required torque is switched off by a manual activation of a switch.

The switch can also be constituted as a button. A user can thus deactivate the adjustment of the actual torque to the required torque so that the tangential impact mechanism is used early and promptly with a corresponding application, such as impact drilling, so that the time needed for the application impact drilling can be minimized.

In another embodiment, the motor current is adjusted to a value less than the stipulated motor current threshold value.

In this manner, the actual torque is advantageously reduced, so that the hand-held machine tool can be used for applications for which the use of the tangential impact mechanism is not desired.

In another embodiment, the adjustment of the actual torque to the required torque takes place by controlling the electric motor with an adjustment signal.

In another embodiment, the adjustment signal is formed as a pulse width modulated signal.

The use of a pulse width modulated (PWM) signal as an adjustment signal for control of the electric motor is designated as the PWM operation of the hand-held machine tool. In this way, the current for the electric motor is reduced, since control of the electric motor in the PWM operation takes place in the form of pulses. This leads to the desired adjustment of the actual torque to a required torque, so that undesired use of the tangential impact mechanism is prevented.

In another embodiment, the electric motor is a brush motor.

In another embodiment, the electric motor is a brush-less motor.

Furthermore, a device for operating a hand-held machine tool with a tangential impact mechanism that is driven by means of a drive shaft and an electric motor is proposed. The device has an adjusting means. The adjusting means is set up for the adjustment of an actual torque to a required torque as a function of a measured motor current of the electric motor, wherein the required torque is less than a triggering torque of the tangential impact mechanism.

The adjusting means can be implemented with hardware technology and/or also software technology. In a hardware-technical implementation, the adjusting means can be formed as a device or a part of a device, for example, as a computer or as a microprocessor. In a software-technical implementation, the adjusting means can be formed as a computer program product, as a function, as a routine, as a part of a program code, or as an executable object.

Furthermore, a control device for a hand-held machine tool is proposed, wherein the control device integrates the device described above for operating the hand-held machine tool. The device is thus a part of the control device of the hand-held machine tool, also designated as a switch.

Moreover, a hand-held machine tool with such a device is proposed. The hand-held machine tool is, in particular, an electric hand-held machine tool, such as an electric screwdriver, a hand-held drilling machine, a chisel hammer, a combi-hammer, a cordless screwdriver, a circular saw, or a reciprocating saw.

BRIEF DESCRIPTION OF THE SEVERAL VIEWS OF THE DRAWING(S)

Figure 2:
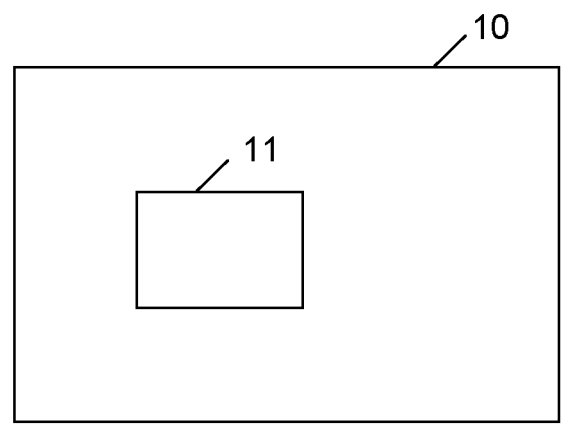
Figure 3:
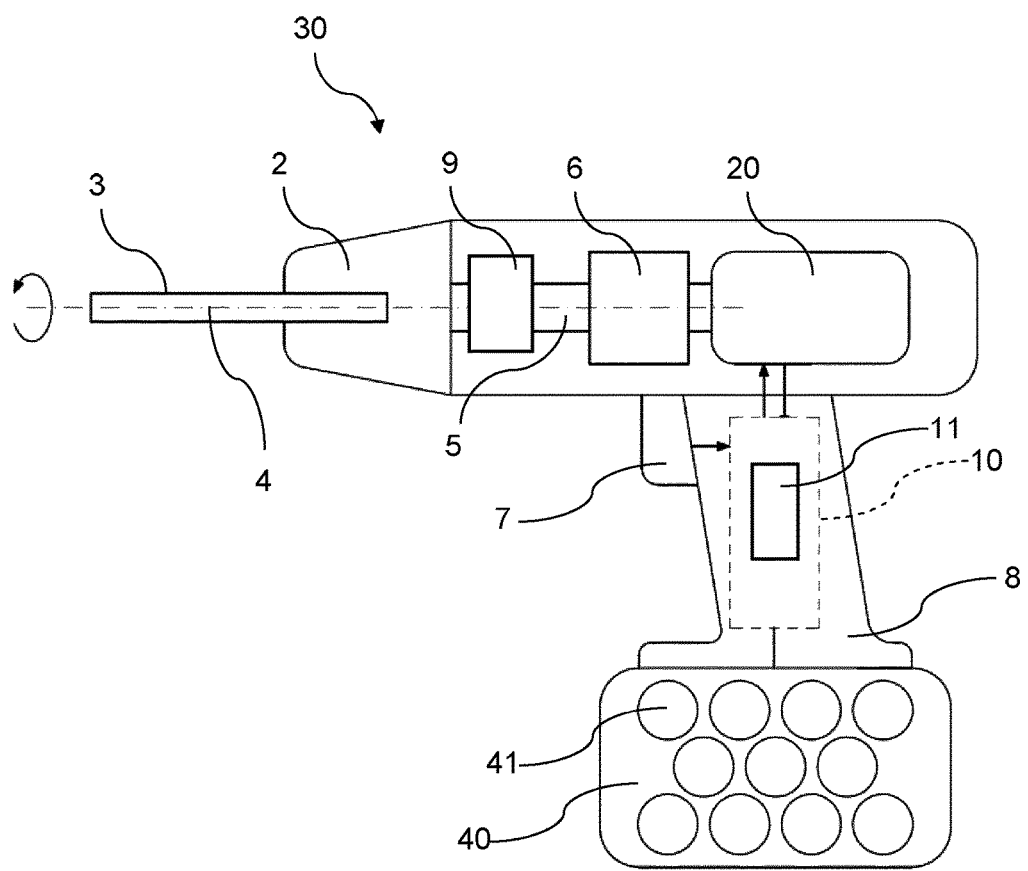

The following description explains the invention with the aid of exemplary embodiments and figures. The figures show the following:

FIG. 1, a schematic flow chart of a method for operating a hand-held machine tool with a tangential impact mechanism that can be driven by means of a drive shaft and an electric motor;

FIG. 2, a schematic block diagram of an embodiment example of a device for operating a hand-held machine tool with a tangential impact mechanism that can be driven by means of a drive shaft and an electric motor; and FIG. 3, a schematic block diagram of a hand-held machine tool.

The same or functionally similar elements are indicated with the same reference symbols in the figures, unless otherwise stated.

DETAILED DESCRIPTION OF THE INVENTION

FIG. 1 is a schematic flow chart of a method for operating a hand-held machine 30, shown in FIG. 3, with a tangential impact mechanism 9 that can be driven by means of a drive shaft 5 and an electric motor 20.

In step 101, a required torque is determined, which is less than a triggering torque of the tangential impact mechanism.

In step 102, an actual torque provided by the drive shaft is adjusted to the determined required torque, as a function of a measured motor current of the electric motor 20.

The proposed method can be applied, for example, to hand-held machine tools 30 with carbon brush motors. The method can also be applied to hand-held machine tools 30 with brushless motors.

FIG. 2 shows a schematic block diagram of an embodiment example of a device 10 for operating a hand-held machine tool 30 with a tangential impact mechanism 9 that can be driven by means of a drive shaft 5 and an electric motor 20.

The device 10 has an adjusting means 11, which is set up so as to adjust the actual torque to a required torque as a function of a measured motor current of the electric motor 20.

FIG. 3 shows a block diagram of a hand-held machine tool 30, which comprises, in particular, integrates, the device 10 of FIG. 2, the electric motor 20, and the tangential impact mechanism 9. FIG. 3 shows an exemplary hand-held machine tool 30, for example, an electric screwdriver. The hand-held machine tool 30 has a tool holder 2, into which a tool 3 can be inserted or affixed. The tools are, for example, a screwdriver bit, a drill, a grinding disk, and a saw blade. The electric motor 20 drives the tool holder 2—here, for example, rotating around a work axis. A drive train between the tool holder 2 and the electric motor 20 can contain a spindle or drive shaft 5, a gear 6, and other components, for example, a torque coupling or an eccentric wheel.

A user starts the hand-held machine tool 30 by activating a button 7. The button 7 is preferably located on a handle, with which the user can hold and guide the hand-held machine tool 30. A control 10 correspondingly provides the activation of the electric motor 20 with current. An exemplary current source of the hand-held machine tool 30 is a battery packet 40 with several secondary battery cells 41.

The invention claimed is:

1. A method for operating a hand-held machine tool with an impact mechanism driven by a drive shaft and an electric motor, the method comprising adjusting an actual torque provided by the drive shaft to a required torque, wherein the required torque is determined by measuring current of the electric motor, the method including switching the impact mechanism on when a value of the determined electric motor current exceeds a stipulated electric motor current threshold value.

2. The method according to claim 1, comprising regulating the actual torque to the required torque.

3. The method according to claim 1, including determining the required torque as a function of the measured electric motor current, wherein the actual torque is regulated to the determined required torque.

4. The method according to claim 1, wherein the stipulated electric motor current threshold value is at least 15 amperes.

5. The method according to claim 1, comprising adjusting the actual torque to the required torque by manually activating a switch to switch the actual torque off.

6. The method according to claim 1, comprising changing the electric motor current to a value less than the stipulated electric motor current threshold value.

7. The method according to claim 1, comprising adjusting the actual torque to the required torque by controlling the electric motor with an adjustment signal.

8. The method according to claim 7, comprising forming the adjustment signal as a pulse width modulated signal.

9. The method according to claim 1, wherein the electric motor is a brush motor.

10. The method according to claim 1, wherein the electric motor is a brush-less motor.

* * * * *